March 10, 1925.  
F. L. SMITH  
1,528,956
RUBBER COVERED ROLLER AND METHOD OF MAKING THE SAME
Filed Nov. 22, 1921
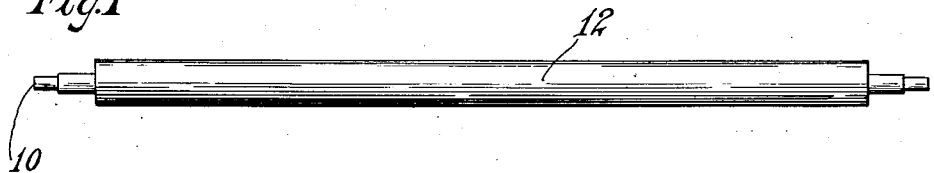
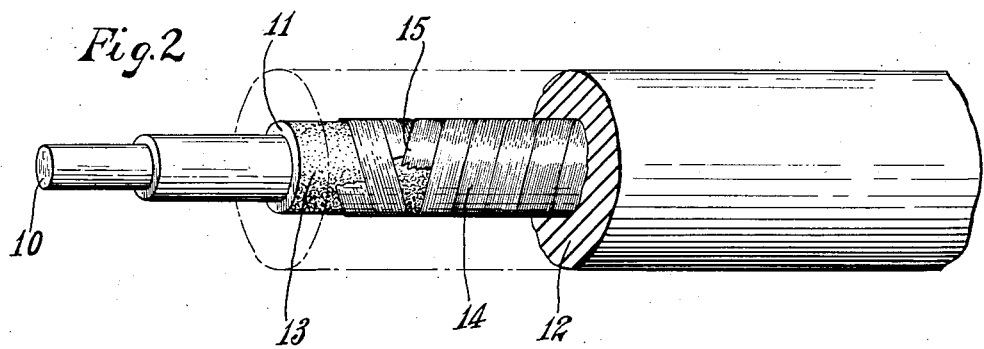
Inventor  
F.L. Smith  
By Robert M. Pierson  
Atty.

Patented Mar. 10, 1925.

1,528,956

UNITED STATES PATENT OFFICE.

FRANK L. SMITH, OF AKRON, OHIO, ASSIGNOR TO THE B. F. GOODRICH COMPANY, OF NEW YORK, N. Y., A CORPORATION OF NEW YORK.

RUBBER-COVERED ROLLER AND METHOD OF MAKING THE SAME.

Application filed November 22, 1921. Serial No. 517,130.

*To all whom it may concern:*

Be it known that I, FRANK L. SMITH, a citizen of the United States, residing at Akron, in the county of Summit and State of Ohio, have invented a certain new and useful Rubber-Covered Roller and Method of Making the Same, of which the following is a specification.

This invention relates to rubber covered rollers such as ink distributing rollers for printing presses and its chief object is to provide an improved roller, particularly by providing an improved tie between the mandrel and the rubber cover. A further object is to reduce cost of manufacture and repair.

Of the accompanying drawings:

Fig. 1 is a side elevation of a roller embodying my invention.

Fig. 2 is a fragmentary perspective view of the same on a larger scale, with parts removed.

Referring to the drawings, 10 is a metal mandrel, upon the cylindrical middle portion 11 of which the roller is built, 12 is a cylindrical vulcanized rubber cushion constituting the main body of the roller, and 13 and 14 respectively are a layer of non-vulcanizing or slow-vulcanizing rubber and a strip of rubberized fabric wound helically thereon for securing the cushion 12 to the mandrel 10. The fabric 14 preferably is a light, weak wefted or weftless, substantially non-stretchable cord fabric, impregnated with vulcanizable rubber.

In constructing the roller the rubber layer 13 preferably is placed upon the mandrel in the form of rubber cement and permitted to dry to its normal tacky condition. The fabric strip 14 is then wound helically thereon under tension, the ends thereof being wound back from the ends of the cushion-supporting part 11 of the mandrel as indicated at 15, so that said ends will be anchored in the body of the roller at a distance from the ends of the latter, the successive layers of the rubberized fabric at the ends of the roller adhering to each other and avoiding slipping and consequent slacking of the fabric strip. The cushion 12 is then applied over the fabric strip, preferably by winding sheeted rubber thereon, in a manner well known in the art, and the roller is then heated in a mold, the cushion 12 and the rubber of the fabric strip 14 thereby being vulcanized together while the layer 13 is vulcanized only slightly or not at all and retains its tacky condition.

In use, the non-stretchable character of the fabric strip 14 prevents the cushion 12 from substantially separating from the mandrel and such separation as occurs is promptly repaired automatically by the fabric sticking again to the tacky rubber layer 13. I prefer the cord fabric to square woven fabric because it is less stretchable than the latter after being wound onto the mandrel under tension.

By applying the fabric in the form of a relatively narrow strip it can be wound onto the mandrel with each cord thereof under a high tension, so that the cushion will be held snugly against the mandrel.

By my method of making rollers I avoid the use of a layer of hard rubber which heretofore has commonly been used to tie the cushion to the mandrel and which usually requires two vulcanizing operations for each roller, since the hard rubber requires to be vulcanized for a longer time than the cushion, especially in the case of printing rollers, where the ink-resisting compound of the cushion vulcanizes in a comparatively short time. A single vulcanizing operation is required for a roller made according to my method, and an improved article is produced.

A further advantage is that when the roller becomes damaged or worn the rubber cushion 12 may readily be replaced, the old cushion and fabric being more easily removed from the mandrel than a cushion secured to the mandrel by a hard rubber layer.

Modifications may be resorted to without departing from the scope of my invention as claimed.

I claim:

1. The method of making a roller which comprises applying a layer of adhesive material to a mandrel, winding a structure of rubberized cords thereon, and vulcanizing a rubber cushion to said structure.

2. The method of making a roller which comprises applying a layer of substantially non-vulcanizing rubber to a mandrel, placing a layer of rubberized fabric thereon, and vulcanizing a rubber cushion to said fabric.

3. The method of making a roller which comprises applying a layer of tacky, adhesive material to a mandrel, winding a structure of rubberized cords under tension onto the adhesively-coated mandrel, placing a cushion of vulcanizable rubber on said structure, and subjecting the whole to a vulcanizing heat.

4. The method of making a roller which comprises applying a layer of substantially non-vulcanizing rubber to a mandrel, helically winding thereon under tension a strip of fabric impregnated with vulcanizable rubber, and vulcanizing a cushion of rubber to said fabric.

5. The method of making a roller which comprises applying a layer of substantially non-vulcanizing rubber to a mandrel, winding a structure of cords and vulcanizable rubber thereon, placing a cushion of vulcanizable rubber on said structure, and subjecting the whole to a vulcanizing heat.

6. The method of making a roller which comprises applying a substantially non-vulcanizing layer of rubber to a mandrel in the form of a cement, winding helically thereon a narrow strip of rubberized cord fabic, and vulcanizing a rubber cushion to said fabric.

7. A roller comprising a mandrel, a layer of rubberized cords wound on said mandrel under tension, and a rubber cushion vulcanized to said cord structure.

8. A roller comprising a mandrel, a layer of substantially unvulcanized rubber thereon, a cord structure wound under tension thereon, and a rubber cushion vulcanized to said cord structure.

9. A roller comprising a mandrel, a vulcanized rubber roller body thereon, and a layer of substantially unvulcanized, tacky rubber between the two and in contact with the mandrel.

10. A roller comprising a mandrel, a layer of substantially unvulcanized rubber thereon, a layer of fibrous material under tension thereon, and a rubber cushion vulcanized to said fibrous material.

11. A roller comprising a mandrel, a layer of substantially unvulcanized rubber thereon, a strip of fabric wound helically thereon, and a body or rubber vulcanized to said fabric.

12. A roller comprising a mandrel, a layer of substantially unvulcanized rubber thereon, a strip of fabric wound thereon and wound back upon itself at the ends of said mandrel, and a body of rubber vulcanized to said fabric.

In witness whereof I have hereunto set my hand this 17th day of November, 1921.

FRANK L. SMITH.